United States Patent
Ito et al.

(10) Patent No.: US 12,291,355 B2
(45) Date of Patent: May 6, 2025

(54) SPACE STRUCTURE CONTROL SYSTEM AND SPACE STRUCTURE CONTROL METHOD

(71) Applicant: Hitachi, Ltd., Tokyo (JP)

(72) Inventors: Makoto Ito, Tokyo (JP); Tsukasa Funane, Tokyo (JP); Koichi Watanabe, Tokyo (JP); Yosuke Tanabe, Tokyo (JP); Hisatoshi Kimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/584,242

(22) Filed: Feb. 22, 2024

(65) Prior Publication Data
US 2024/0308697 A1    Sep. 19, 2024

(30) Foreign Application Priority Data
Mar. 17, 2023    (JP) ................. 2023-042818

(51) Int. Cl.
*B64G 1/24*    (2006.01)
*B64G 1/10*    (2006.01)
*B64G 1/66*    (2006.01)
*H01Q 1/28*    (2006.01)

(52) U.S. Cl.
CPC ............ *B64G 1/242* (2013.01); *B64G 1/10* (2013.01); *B64G 1/66* (2013.01); *H01Q 1/288* (2013.01)

(58) Field of Classification Search
CPC . B64G 1/242; B64G 1/10; B64G 1/66; B64G 1/2222; B64G 1/244; B64G 1/44; H01Q 1/288
See application file for complete search history.

(56) References Cited

U.S. PATENT DOCUMENTS

2009/0283132 A1* 11/2009 Huang .................... B64G 1/44
                                                              136/245

FOREIGN PATENT DOCUMENTS

JP          2005072913 A  *  3/2005

* cited by examiner

*Primary Examiner* — Valentina Xavier
(74) *Attorney, Agent, or Firm* — Miles & Stockbridge, P.C.

(57) ABSTRACT

The space structure control system includes: a space structure; an artificial satellite connected to the space structure; and a propulsion device installed on the artificial satellite and configured to control an orbit and an attitude of the artificial satellite, in which the space structure includes a film-like structure, a solar reflectance control device that controls a spatial pattern of a solar reflectance in a reflecting mirror provided in the film-like structure, and a shape retaining device that is connected to the film-like structure, the propulsion device rotates the film-like structure to generate a centrifugal force, the solar reflectance control device controls a solar reflectance in the reflecting mirror to control a solar radiation pressure to be applied to the reflecting mirror, a three-dimensional shape of the film-like structure is controlled based on the centrifugal force generated by the rotation of the film-like structure and the solar radiation pressure, and the shape of the film-like structure is retained or stabilized by the shape retaining device.

15 Claims, 7 Drawing Sheets

SPACE STRUCTURE CONTROL SYSTEM AND SPACE STRUCTURE CONTROL METHOD

CROSS-REFERENCE TO RELATED APPLICATION

This application claims priority to Japanese Patent Application No. 2023-042818 filed on Mar. 17, 2023, the entire contents of which are incorporated by reference herein.

BACKGROUND OF THE INVENTION

1. Field of the Invention

The present invention relates to a space structure that is deployed in space.

2. Description of Related Art

Examples of a space structure that is transported from the ground to space and deployed include an antenna of an artificial satellite and a solar concentrator reflecting surface used for a solar photovoltaic panel.

As the antenna of the artificial satellite, a parabolic antenna capable of obtaining a high gain with a simple structure is frequently used, and it is necessary to increase the size of a reflecting mirror to increase the gain of the antenna. In the related art, a light-weight parabolic antenna that is installed on an artificial satellite is a deployable antenna that is deployed in space using a thin film reflecting surface and a frame or a rib to form a curved surface of a reflecting mirror, and implements a 10-m class light-weight large parabolic antenna. Here, in order to further increase the gain, a further increase in size is required. To that end, the weight increases, and costs for launching the antenna using a rocket also increase. Therefore, research for a new film deployment method, a surface shape control, and the like that aim to reduce the weight has progressed.

As a prior art document of this technical field, JP2005-72913A is disclosed. JP2005-72913A describes a shape control method in which, using an electromagnetic wave concentrator for space that includes a reflecting mirror formed of a thin film material, distributions of emissivity and reflectance of a reflecting mirror surface are adjusted to approximate the shape of the reflecting mirror surface to a designated shape.

JP2005-72913A describes the surface shape control based on the emissivity and the reflectance but does not consider a deployment time of a film structure or an operation time for modifying the effect of gravity gradient, air disturbance, or the like.

SUMMARY OF THE INVENTION

Accordingly, an object of the invention is to provide a space structure control system where, when the size of a space structure to be deployed in space increases, the weight is light, a surface shape control is simple, and a deployment time is short.

According to the invention, for example, there is provided a space structure control system that controls a shape of a space structure to be deployed in space, the space structure control system including: the space structure; an artificial satellite connected to the space structure; and a propulsion device installed on the artificial satellite and configured to control an orbit and an attitude of the artificial satellite, in which the space structure includes a film-like structure, a solar reflectance control device that controls a spatial pattern of a solar reflectance in a reflecting mirror provided in the film-like structure, and a shape retaining device that is connected to the film-like structure, the propulsion device rotates the film-like structure to generate a centrifugal force, the solar reflectance control device controls a solar reflectance in the reflecting mirror to control a solar radiation pressure to be applied to the reflecting mirror, a three-dimensional shape of the film-like structure is controlled based on the centrifugal force generated by the rotation of the film-like structure and the solar radiation pressure, and the shape of the film-like structure is retained or stabilized by the shape retaining device.

According to the invention, it is possible to provide a space structure control system where, when the size of a space structure to be deployed in space increases, the weight is lighter, a surface shape control is simple, and a deployment time is short.

DESCRIPTION OF EMBODIMENTS

Hereinafter, embodiments of the invention will be described using the drawings. In the present embodiment, an antenna installed on an artificial satellite will be described as an example of a space structure.

First Embodiment

Figure 1:
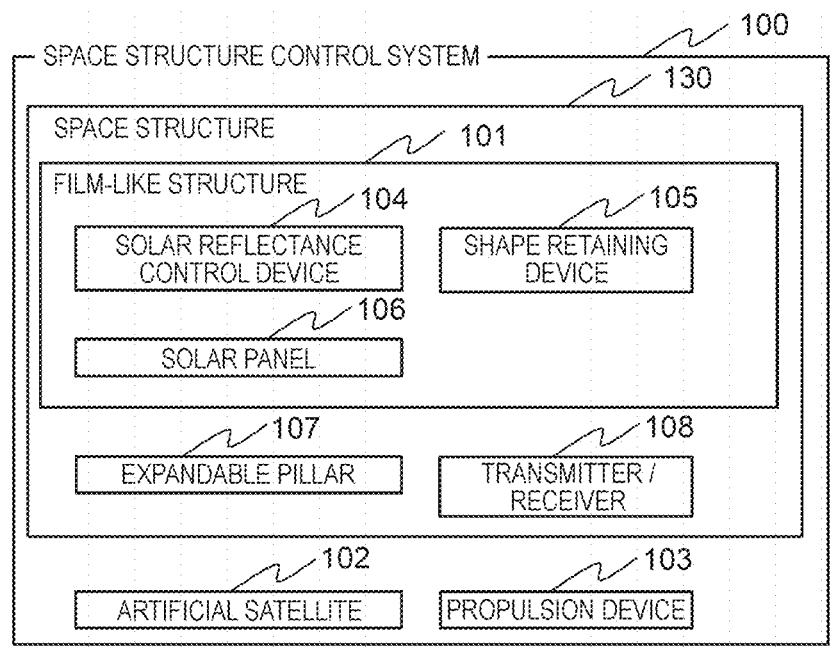
FIG. 1 is a configuration block diagram illustrating a space structure control system according to a first embodiment.

FIG. 1 is a configuration block diagram illustrating a space structure control system according to the present embodiment. In FIG. 1, a space structure control system 100 includes a space structure 130, an artificial satellite 102, and a propulsion device 103. In addition, the space structure 130 configures an antenna as a space structure, and includes a film-like structure 101, an expandable pillar 107, and a transmitter/receiver 108. Further, the film-like structure 101 includes a solar reflectance control device 104, a shape retaining device 105, and a solar panel 106.

Figure 2:
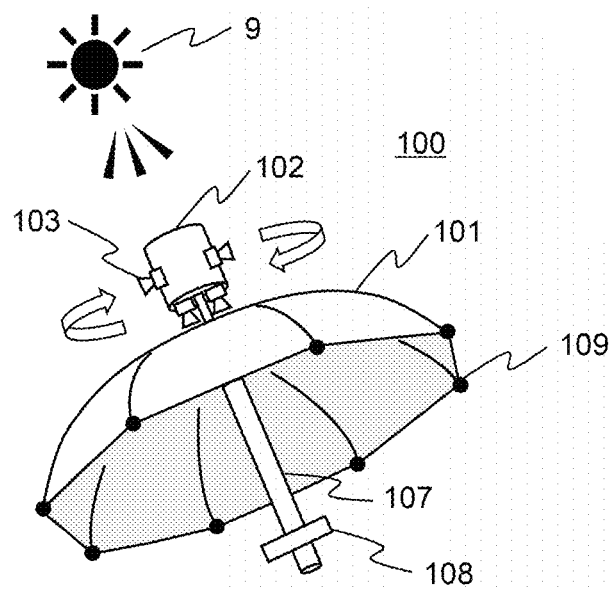
FIG. 2 is a perspective view illustrating an overall configuration of the space structure control system according to the first embodiment.

FIG. 2 is a perspective view illustrating an overall configuration of the space structure control system 100 according to the present embodiment. In FIG. 2, the same configurations as those of FIG. 1 are represented by the same reference numerals, and the description thereof will not be repeated. As illustrated in FIG. 2, the artificial satellite 102 is connected to a central axis of the film-like structure 101, and the film-like structure 101 is rotated by the propulsion device 103 installed on the artificial satellite 102. Reference numeral 9 schematically represents the sun. In addition, reference numeral 109 represents a small weight.

Figure 3:
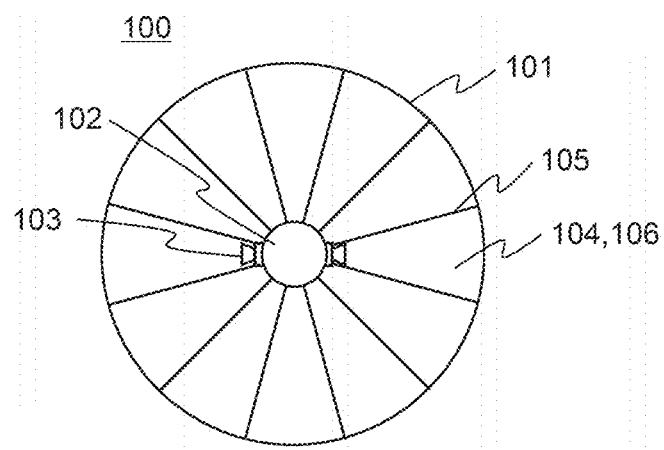
FIG. 3 is a top view illustrating the space structure control system in FIG. 2 when seen from the sun side.
Figure 4:
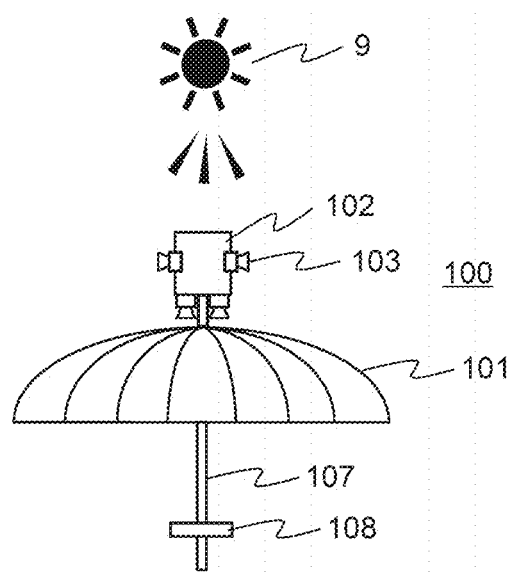
FIG. 4 is a side view illustrating the space structure control system in FIG. 2.

FIG. 3 is a top view illustrating the space structure control system 100 in FIG. 2 when seen from the sun side. In addition, FIG. 4 is a side view illustrating the space structure control system 100 in FIG. 2. Further, FIG. 5 is a developed view illustrating the film-like structure 101 in FIG. 2 when seen from the sun side.

Figure 5:
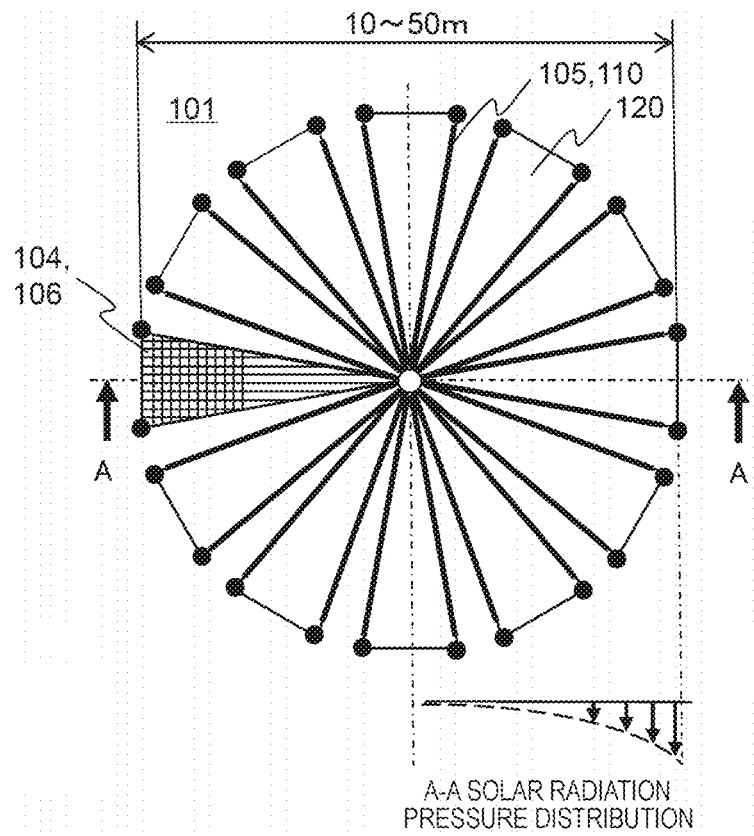
FIG. 5 is a developed view illustrating the film-like structure in FIG. 2 when seen from the sun side.

As illustrated in FIG. 5, the film-like structure 101 according to the present embodiment configures a large deployable antenna with an aperture size of 10 to 50 m class. The film-like structure 101 is formed of a plurality of film surface modules 120 as a plurality of triangular thin films obtained by radially dividing a thin film having a parabolic shape (paraboloidal) that is a three-dimensional shape configuring the antenna. In addition, the plurality of film surface modules 120 are joined at the center portion. Each of the film surface modules 120 is not limited to a triangular shape and may be a quadrangular shape or a strip shape of which the center portion is cut off.

Figure 6:
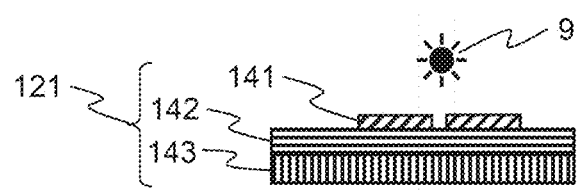
FIG. 6 is a cross-sectional view illustrating a thin film structure of the film-like structure according to the first embodiment.

The film surface modules 120 have a thin film structure where a reflecting mirror and a liquid crystal display device are attached to a thin film. FIG. 6 is a schematic diagram illustrating the thin film structure according to the present embodiment and is a cross-sectional view illustrating the thin film structure. As illustrated in FIG. 6, a thin film structure 121 is configured by a liquid crystal display device 141, a thin film 142, and a reflecting mirror 143 from the sun 9 side. The liquid crystal display device 141 can control a spatial pattern of a solar reflectance in the reflecting mirror 143. Therefore, the liquid crystal display device 141 functions as the solar reflectance control device 104. The solar reflectance control device 104 can control a solar reflectance in the reflecting mirror 143 to control a solar radiation pressure to be applied to the reflecting mirror 143. The solar reflectance control device 104 may be a device other than the liquid crystal display device 141, for example, an electrochromic device or a device that can control transmittance or an absorptance of light using a material or the like.

Figure 7:
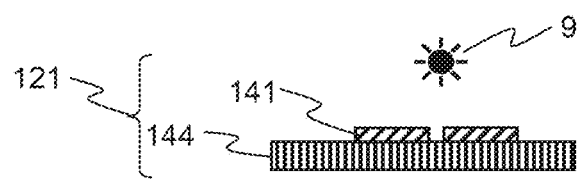
FIG. 7 is a cross-sectional view illustrating another thin film structure of the film-like structure according to the first embodiment.

As illustrated in FIG. 7, the thin film structure 121 of the film-like structure 101 may be configured to include a reflecting mirror 144 where a thin film and a reflecting mirror are integrated.

As a film material of the thin film 142, a material having excellent resistance to space environment, for example, a polyimide film, a glass fiber reinforced plastic (GFRP) material, or a carbon fiber reinforced plastic (CFRP) material is preferably used. In addition, as the reflecting mirror 143, a zirconium alloy material, a GFRP material, or a CFRP material is preferably used.

In addition, the film surface module 120 includes the solar panel 106 that measures an illuminance of a film surface, that is, a photodetector that functions as an illuminometer. The solar reflectance control device 104 controls a solar reflectance in the reflecting mirror 143 or 144 based on information from the solar panel 106.

In FIG. 5, when the solar reflectance control device 104 controls a solar reflectance in the reflecting mirror to control a solar radiation pressure to be applied to the reflecting mirror, a solar radiation pressure distribution in an A-A cross-section to be applied to the film-like structure 101 is illustrated in the lower portion of the drawing. As illustrated in FIG. 5, by controlling the solar radiation pressure, the film-like structure 101 formed of the plurality of film surface modules 120 can be controlled in a parabolic shape configuring the antenna.

The film-like structure 101 is transported in a folded state due to a limit in storage volume during the transport from the ground to space. After being transported to space, the film-like structure 101 is rotated by the propulsion device 103 installed on the artificial satellite 102, and is deployed using the centrifugal force generated by the rotation. Next, due to a balance between the centrifugal force generated by the rotation of the film-like structure 101 and the solar radiation pressure, the film-like structure 101 is controlled to have a parabolic shape as the three-dimensional shape. As illustrated in FIG. 5, in each of the plurality of film surface modules 120 configuring the film-like structure 101, a grounding sensor 110 is provided at two radial sides, and contact between each of the film surface modules 120 and the film surface module 120 adjacent thereto is detected to detect completion of the formation of the three-dimensional shape of the film-like structure 101.

In addition, in the film surface module 120, the shape retaining device 105 is provided at the two radial sides, and the shape after completing the formation of the shape of the film-like structure 101 is retained. Specifically, the shape retaining device 105 is configured by a tether connected to the film-like structure 101, a tether expansion control device, a magnet, a curable resin, a latch mechanism, or the like. The shape retaining device 105 may include an infrared sensor or a camera and may retain or stabilize the shape of the film-like structure 101 based on information of the infrared sensor or the camera.

In the space structure control system 100 according to the present embodiment, the parabolic shape of the film-like structure 101 is retained, and an antenna function is exhibited by the transmitter/receiver 108 connected to the artificial satellite 102 or the film-like structure 101 through the expandable pillar 107. The transmitter/receiver 108 may be connected through the tether instead of the expandable pillar.

The artificial satellite 102 may control a rotation speed using the propulsion device 103 to retain the attitude of the film-like structure 101 (to retain the orientation direction).

In addition, the artificial satellite 102 may have a function of separating the artificial satellite itself as a weight from the film-like structure 101 to retain the shape of the film-like structure 101.

In addition, the solar reflectance control device 104 may control an attitude of the three-dimensional shape of the film-like structure 101 by controlling a solar reflectance in the reflecting mirror 143 to control a solar radiation pressure to be applied to the reflecting mirror 143.

Figure 8:
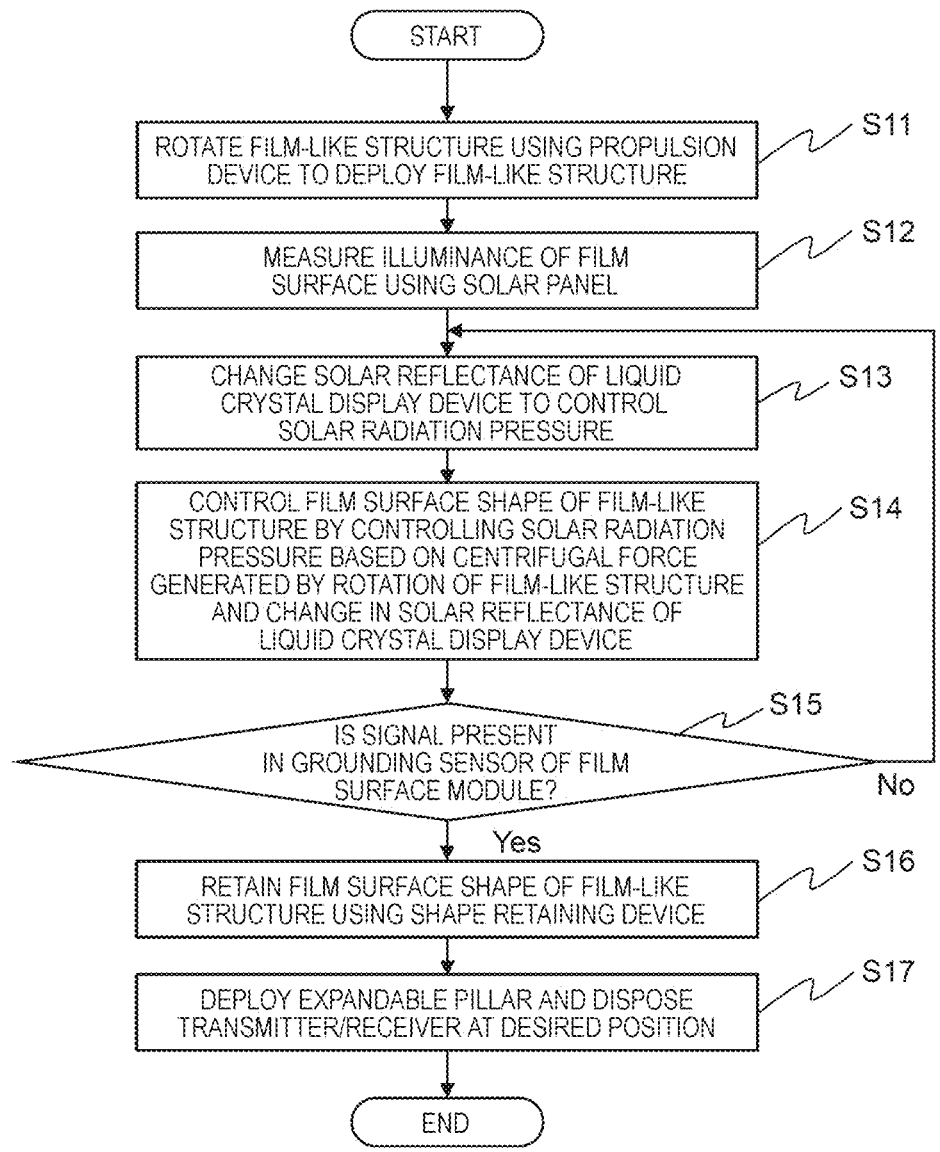
FIG. 8 is a process flowchart illustrating a shape control of the film-like structure of the space structure control system according to the first embodiment.

FIG. 8 is a process flowchart illustrating a shape control of the film-like structure of the space structure control system according to the present embodiment. In FIG. 8, first, in Step S11, the film-like structure 101 is rotated using the propulsion device 103 to deploy the film-like structure 101. Next, in Step S12, an illuminance of a film surface is measured using the solar panel. In Step S13, the solar reflectance of the liquid crystal display device as the solar reflectance control device 104 is changed to control the solar radiation pressure. In Step S14, the film surface shape of the film-like structure 101 is controlled by controlling the solar radiation pressure based on the centrifugal force generated by the rotation of the film-like structure and a change in the solar reflectance of the liquid crystal display device. Next, in Step S15, whether a signal is present in the grounding sensor 110 provided at the two radial sides of each of the plurality of film surface modules 120 configuring the film-like structure 101 is determined. When the signal is not present, it is determined that the control of the film surface shape of the film-like structure 101 is not completed, and the process returns to step S13. In Step S15, when the signal is present, it is determined that the deployment by the rotation of the film-like structure 101 and the control of the film surface shape are completed, and the process proceeds to Step S16.

In Step S16, the film surface shape of the film-like structure 101 is retained using the shape retaining device. In Step S17, the expandable pillar 107 is deployed, and the transmitter/receiver 108 is disposed at a desired position.

This way, in the present embodiment, the space structure 130 is transported in a folded state due to a limit in storage volume during the transport from the ground to space. Next, after being transported to space, the film-like structure 101 is rotated by the propulsion device 103 installed on the artificial satellite 102, and is deployed using the centrifugal force generated by the rotation. Therefore, the space structure control system where the deployment time is short can be provided. In addition, the film-like structure 101 includes the solar reflectance control device 104. Therefore, the solar reflectance control device 104 can control a solar reflectance in the reflecting mirror 143 to control a solar radiation pressure to be applied to the reflecting mirror 143. Accordingly, due to a balance between the centrifugal force generated by the rotation of the film-like structure 101 and the solar radiation pressure, the parabolic shape of the film-like structure 101 can be formed. Accordingly, the orbit and the attitude of the space structure can also be controlled by the propulsion device 103 and the solar reflectance control device 104, and the effect of gravity gradient, air disturbance, or the like can be modified. That is, it is possible to provide a space structure control system where, when the size of a space structure to be deployed in space increases, the weight is lighter, a surface shape control is simple, and a deployment time is short.

Second Embodiment

In the first embodiment, the 10 to 50 m class large deployable antenna has been described as the space structure. In the present embodiment, a 100 to 500 m class large deployable antenna will be described as a larger space structure.

Figure 9:
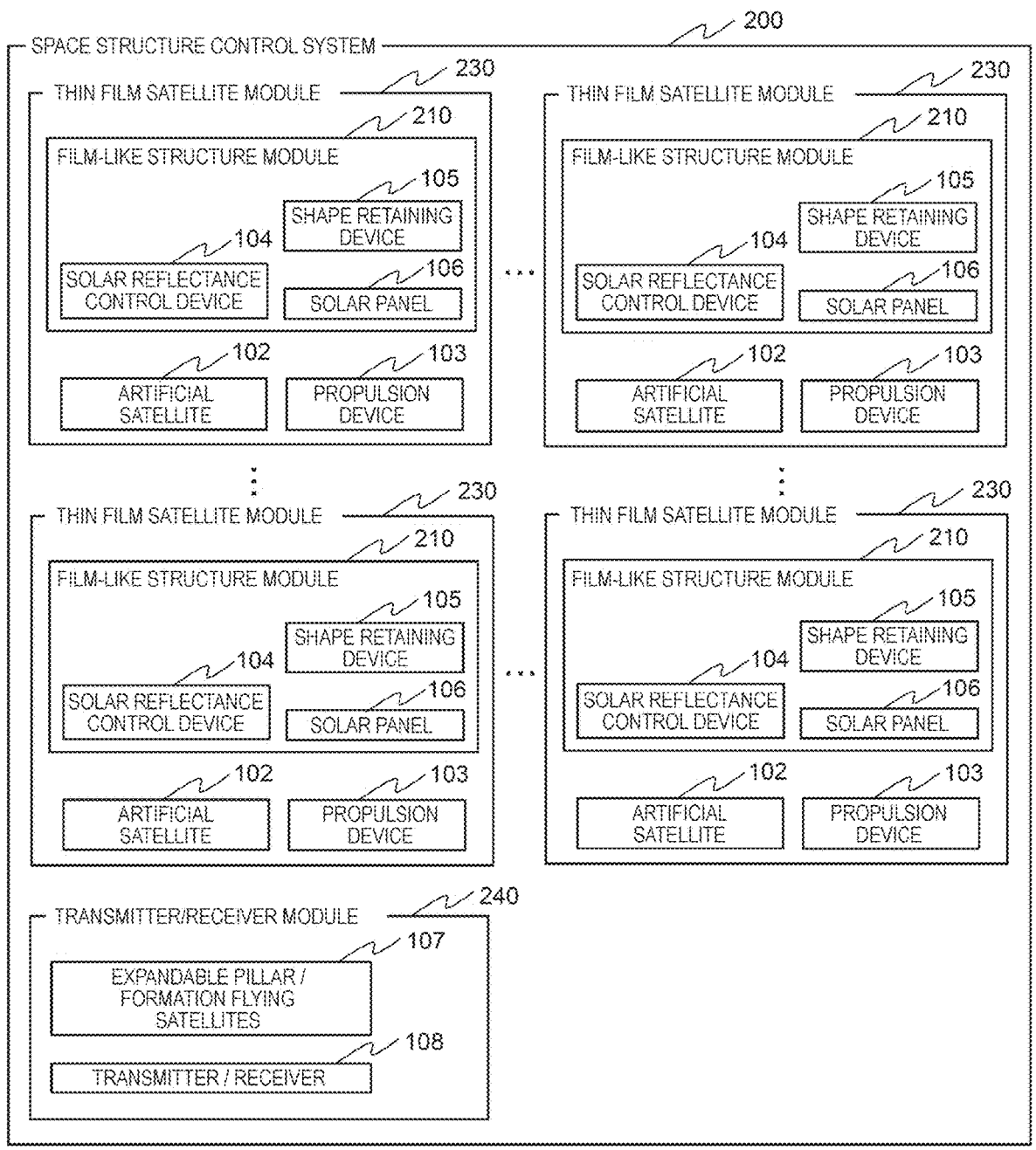
FIG. 9 is a configuration block diagram illustrating a space structure control system according to a second embodiment.

FIG. 9 is a configuration block diagram illustrating a space structure control system according to the present embodiment. In FIG. 9, the same configurations as those of FIG. 1 are represented by the same reference numerals, and the description thereof will not be repeated. In FIG. 9, a space structure control system 200 is configured by a plurality of thin film satellite modules 230 and transmitter/receiver module 240. In addition, the thin film satellite module 230 includes a film-like structure module 210, the artificial satellite 102, and the propulsion device 103. Further, as in the film-like structure 101 according to the first embodiment, the film-like structure module 210 includes the solar reflectance control device 104, the shape retaining device 105, and the solar panel 106.

Figure 10:
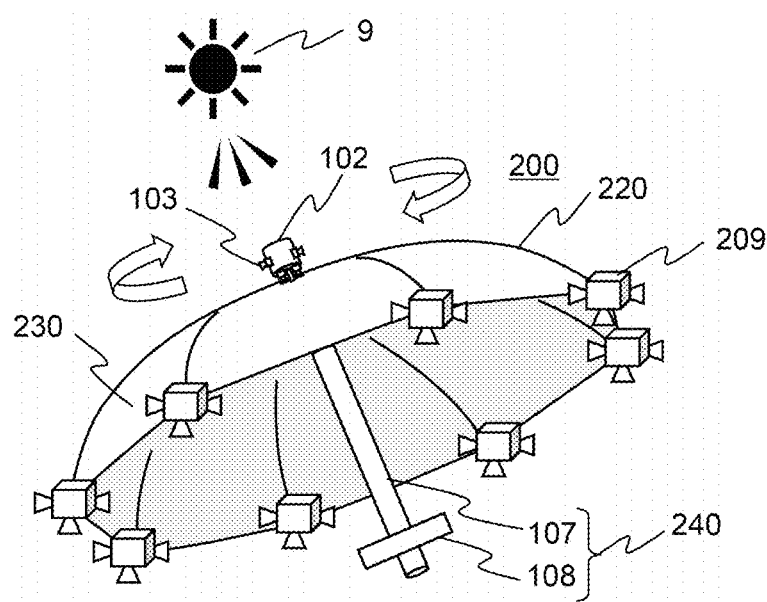
FIG. 10 is a perspective view illustrating an overall configuration of the space structure control system according to the second embodiment.

FIG. 10 is a perspective view illustrating an overall configuration of the space structure control system 200 according to the present embodiment. In FIG. 10, the same configurations as those of FIG. 2 are represented by the same reference numerals, and the description thereof will not be repeated. In FIG. 10, a point different from FIG. 2 is that a film-like structure 220 configuring the space structure is configured by the plurality of thin film satellite modules 230 and an end satellite 209 that is a small satellite is connected to the periphery of the thin film satellite module 230. That is, the end satellite 209 refers to, for example, an artificial satellite that is provided at an end portion of the thin film satellite module 230 and may be replaced with a small satellite.

Figure 11:
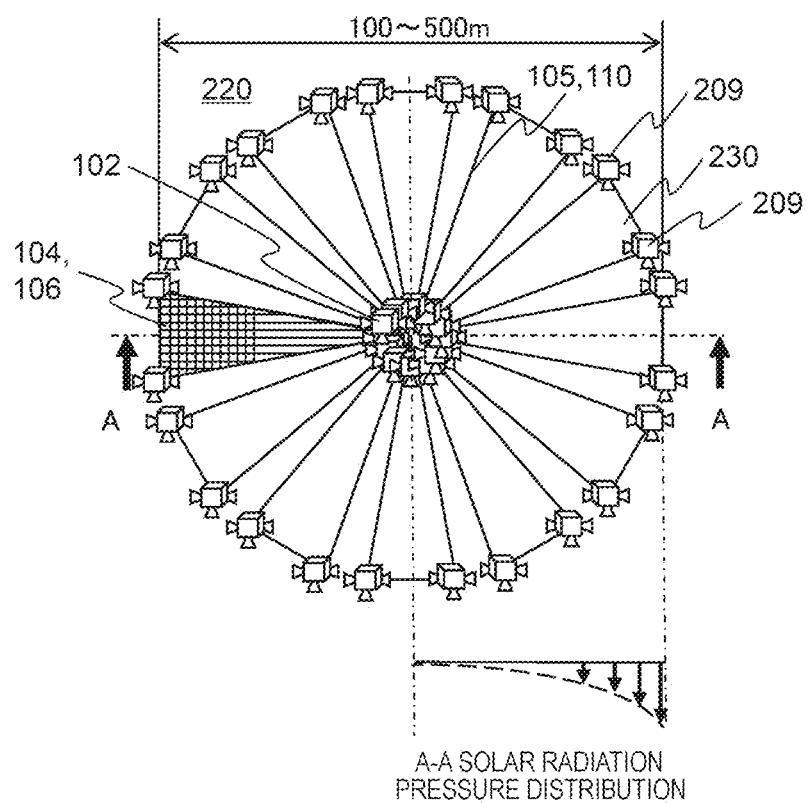
FIG. 11 is a developed view illustrating the film-like structure in FIG. 10 when seen from the sun side.

FIG. 11 is a developed view illustrating the film-like structure 220 in FIG. 10 when seen from the sun side. As illustrated in FIG. 11, the film-like structure 220 according to the present embodiment configures a large deployable antenna with an aperture size of 100 to 500 m class. The film-like structure 220 configuring the space structure is formed of the plurality of thin film satellite modules 230 as a plurality of triangular thin films obtained by radially dividing a thin film having a parabolic shape configuring the antenna. In addition, in the plurality of thin film satellite modules 230, the end satellite 209 is connected to a thin film end portion. Each of the plurality of thin film satellite modules 230 is not limited to a triangular shape and may be a quadrangular shape or a strip shape of which the center portion is cut off.

As in the film surface modules 120 according to the first embodiment, the thin film satellite module 230 has a thin film structure where a reflecting mirror and a liquid crystal display device are attached to a thin film. That is, the liquid crystal display device functions as the solar reflectance control device 104 and can control a solar reflectance in the reflecting mirror to control a solar radiation pressure to be applied to the reflecting mirror. In addition, the thin film satellite module 230 includes the solar panel 106 as in the film surface module 120.

Even in FIG. 11, as in FIG. 5, by controlling the solar radiation pressure using the solar reflectance control device 104, the film-like structure 220 formed of the plurality of thin film satellite modules 230 can be controlled to have the parabolic shape configuring the antenna.

In the present embodiment, the space structure is transported in a folded state due to a limit in storage volume during the transport from the ground to space. After being transported to space, the film-like structure 220 of the space structure is rotated by the propulsion device 103 and the end satellite 209 installed on the artificial satellite 102, and is deployed using the centrifugal force generated by the rotation. Next, due to a balance between the centrifugal force generated by the rotation of the film-like structure 220 and the solar radiation pressure, the film-like structure 220 is controlled to have a parabolic shape as the three-dimensional shape.

In addition, in the thin film satellite module 230, the shape retaining device 105 is provided at the two radial sides, and the shape after completing the formation of the shape of the thin film structure is retained. The shape retaining device 105 has the same configuration as that of the first embodiment, and the description thereof will not be repeated.

In the space structure control system 200 according to the present embodiment, the parabolic shape of the film-like structure 220 of the space structure is retained, and an antenna function is exhibited by the transmitter/receiver 108 connected to the artificial satellite 102 or the film-like structure 220 through the expandable pillar 107 in the transmitter/receiver module 240. The transmitter/receiver 108 may be connected through formation flying satellites instead of the expandable pillar.

In addition, the artificial satellite 102 may control a rotation speed using the propulsion device 103 to retain the attitude of the film-like structure 220 (to retain the orientation direction).

In addition, the artificial satellite 102 may have a function of separating the artificial satellite itself as a weight from the film-like structure 220 to retain the shape of the film-like structure 220.

In addition, the solar reflectance control device 104 may control an attitude of the three-dimensional shape of the film-like structure 220 by controlling a solar reflectance in the reflecting mirror to control a solar radiation pressure to be applied to the reflecting mirror.

This way, in the present embodiment, the space structure is transported in a folded state due to a limit in storage volume during the transport from the ground to space. Next, after being transported to space, the film-like structure 220 is rotated by the propulsion device 103 and the end satellite 209 installed on the artificial satellite 102. As a result, the film-like structure 101 is deployed using the centrifugal force generated by the rotation. Therefore, as compared to the first embodiment, the thrust generated by the end satellite 209 is also used, and thus the space structure control system where the deployment time for the larger space structure is short can be provided. In addition, as in the first embodiment, due to a balance between the centrifugal force generated by the rotation of the film-like structure 220 and the solar radiation pressure, the parabolic shape of the film-like structure 220 can be formed. Accordingly, the orbit and the attitude of the space structure can also be controlled by the propulsion device 103 and the solar reflectance control device 104, and the effect of gravity gradient, air disturbance, or the like can be modified. That is, it is possible to provide a space structure control system where, when the size of a space structure to be deployed in space further increases, the weight is lighter, a surface shape control is simple, and a deployment time is short.

Third Embodiment

In the second embodiment, the 100 to 500 m class large deployable antenna has been described as the space structure. In the present embodiment, a km class super large deployable antenna will be described as a much larger space structure.

Figure 12:
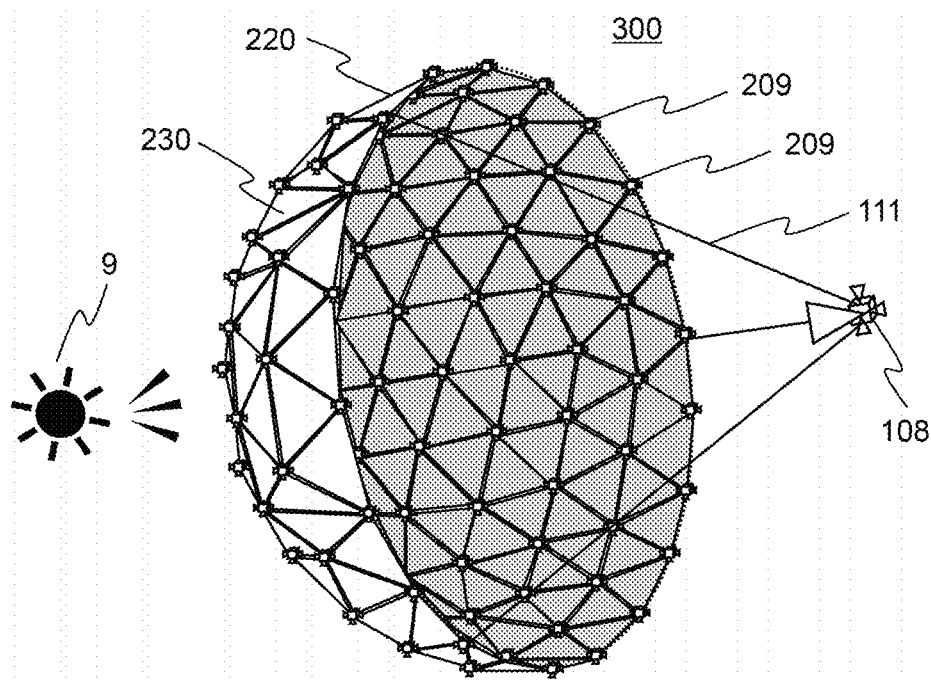
FIG. 12 is a perspective view illustrating an overall configuration of a space structure control system according to a third embodiment.

FIG. 12 is a perspective view illustrating an overall configuration of a space structure control system 300 according to the present embodiment. In FIG. 12, the same configurations as those of FIG. 10 are represented by the same reference numerals, and the description thereof will not be repeated. In FIG. 12, a point different from FIG. 10 is that the film-like structure 220 having the parabolic shape configuring the antenna configures a super large deployable antenna with a km class aperture size. In addition, the difference is that the plurality of thin film satellite modules 230 are arranged and connected in a radiation direction and a circumferential direction of the film-like structure 220 having the parabolic shape configuring the antenna.

As illustrated in FIG. 12, as in the second embodiment, the thin film satellite module 230 is a triangular thin film, and the end satellite 209 is connected to an apex of the thin film. The thin film satellite module 230 is not limited to a triangular shape and may be a quadrangular shape or a strip shape.

Figure 13:
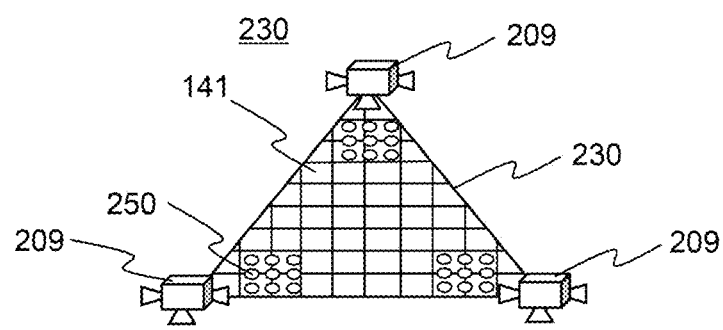
FIG. 13 is a diagram illustrating the thin film satellite module in FIG. 12 when seen from the sun side.

FIG. 13 is a diagram illustrating the thin film satellite module 230 in FIG. 12 when seen from the sun side. As illustrated in FIG. 13, the thin film satellite module 230 includes the liquid crystal display device 141 on the thin film on the sun side. That is, as in the film surface modules 120 according to the first embodiment, the thin film satellite module 230 has a thin film structure where a reflecting mirror and a liquid crystal display device are attached to a thin film. Accordingly, the liquid crystal display device 141 functions as the solar reflectance control device 104 and can control a solar reflectance in the reflecting mirror to control a solar radiation pressure to be applied to the reflecting mirror. In addition, the thin film satellite module 230 includes the solar panel 106 as in the film surface module 120. Accordingly, even in the present embodiment, by controlling the solar radiation pressure using the solar reflectance control device 104, the film-like structure 220 formed of the plurality of thin film satellite modules 230 can be controlled to have the parabolic shape configuring the antenna.

The film-like structure 220 having the parabolic shape configuring the antenna according to the present embodiment is the km class super large antenna. Therefore, a high gain can be obtained, and an electromagnetic wave in a narrow range can be detected. Accordingly, as illustrated in FIG. 13, by providing an array patch antenna 250 at an end portion of the thin film satellite module 230, an electromagnetic wave in a wide range can be detected while the gain is low. It is preferable that signal line connection with the array patch antenna 250 is wired connection through the thin film or the end satellite in consideration of time delay.

In the present embodiment, the space structure is transported in a folded state due to a limit in storage volume during the transport from the ground to space. After transporting the space structure to space, the thin film is held or pulled to deploy the thin film satellite module 230 using the end satellite 209 connected to the thin film satellite module 230. The plurality of thin film satellite modules 230 are connected to each other to deploy the film-like structure 220 of the space structure. By controlling the solar radiation pressure, the parabolic shape as the three-dimensional shape of the film-like structure 220 can be retained and controlled. The entire film-like structure 220 may be rotated by the end satellite 209 and deployed using the centrifugal force generated by the rotation.

In addition, in the thin film satellite module 230, the shape retaining device 105 is provided at each of sides configuring the thin film satellite module 230, and the shape after completing the formation of the shape of the film-like structure 220 is retained. The shape retaining device 105 has the same configuration as that of the first embodiment, and the description thereof will not be repeated.

In the space structure control system 300 according to the present embodiment, the parabolic shape of the film-like structure 220 of the space structure is retained, and an antenna function is exhibited by the transmitter/receiver 108 connected to the film-like structure 220 through a tether 111. The transmitter/receiver 108 may be connected through formation flying satellites instead of the tether.

In addition, the solar reflectance control device 104 may control an attitude of the three-dimensional shape of the film-like structure 220 by controlling a solar reflectance in the reflecting mirror to control a solar radiation pressure to be applied to the reflecting mirror.

This way, in the present embodiment, the space structure is transported in a folded state due to a limit in storage volume during the transport from the ground to space. After transporting the space structure to space, the thin film is held or pulled to deploy the thin film satellite module 230 using the end satellite 209 connected to the thin film satellite module 230. The plurality of thin film satellite modules 230 are arranged and connected in the radiation direction and the circumferential direction of the film-like structure 220 having the parabolic shape configuring the antenna. As a result, the film-like structure 220 of the space structure is deployed. Therefore, as compared to the second embodiment, the space structure control system where the deployment time for the super large space structure is short can be provided. In addition, as in the first or second embodiment, the parabolic shape of the film-like structure can be formed by controlling the solar radiation pressure. Accordingly, the orbit and the attitude of the space structure can also be controlled by the propulsion device 103 and the solar reflectance control device 104, and the effect of gravity gradient, air disturbance, or the like can be modified. That is, it is possible to provide a space structure control system where, in a super large space structure to be deployed in space, the weight is lighter, a surface shape control is simple, and a deployment time is short.

The invention is not limited to the embodiment and includes various modification examples. For example, the embodiments have been described in detail in order to easily describe the invention, and the invention is not necessarily to include all the configurations described above. For example, in the above-described embodiments, the antenna installed on the artificial satellite has been described as an example of the space structure. However, the space structure may be an electromagnetic wave concentrator such as a solar concentrator reflecting surface used for a solar photovoltaic panel. In addition, the three-dimensional shape of the film-like structure is not limited to the parabolic shape. In addition, a part of the configuration of one embodiment can be replaced with the configuration of another embodiment. Further the configuration of one embodiment can be added to the configuration of another embodiment. In addition, addition, deletion, and replacement of another configuration can be made for a part of the configuration each of the embodiments.

What is claimed is:

1. A space structure control system that controls a shape of a space structure to be deployed in space, the space structure control system comprising:
   the space structure;
   an artificial satellite connected to the space structure; and
   a propulsion device installed on the artificial satellite and configured to control an orbit and an attitude of the artificial satellite,
   wherein the space structure includes a film-like structure, a solar reflectance control device that controls a spatial pattern of a solar reflectance in a reflecting mirror provided in the film-like structure, and a shape retaining device that is connected to the film-like structure,
   the propulsion device rotates the film-like structure to generate a centrifugal force,
   the solar reflectance control device controls a solar reflectance in the reflecting mirror to control a solar radiation pressure to be applied to the reflecting mirror,
   a three-dimensional shape of the film-like structure is controlled based on the centrifugal force generated by the rotation of the film-like structure and the solar radiation pressure, and
   the shape of the film-like structure is retained or stabilized by the shape retaining device.

2. The space structure control system according to claim 1,
   wherein the artificial satellite is connected to a central axis of the film-like structure, and
   the film-like structure is deployed to form the three-dimensional shape using the centrifugal force with which the film-like structure is rotated by the propulsion device installed on the artificial satellite.

3. The space structure control system according to claim 1,
   wherein the solar reflectance control device is a liquid crystal display device or an electrochromic device that electrically controls a reflectance of light.

4. The space structure control system according to claim 1,
   wherein the film-like structure is formed of a plurality of film surface modules obtained by radially dividing a thin film having the three-dimensional shape, and
   the shape retaining device is provided at two radial sides of the film surface module, and is a tether connected to the film-like structure, a tether expansion control device, a magnet, a curable resin, or a latch mechanism.

5. The space structure control system according to claim 1, further comprising a solar panel configured to measure an illuminance of a film surface of the film-like structure,
   wherein the solar reflectance control device controls a solar reflectance in the reflecting mirror based on information of the solar panel.

6. The space structure control system according to claim 1,
   wherein the shape retaining device includes an infrared sensor or a camera and retains or stabilizes the shape of the film-like structure based on information of the infrared sensor or the camera.

7. The space structure control system according to claim 1,
   wherein the three-dimensional shape of the film-like structure is a parabolic shape, and
   the space structure control system further comprises transmitter/receiver connected to the artificial a satellite or the film-like structure through an expandable pillar or a tether and has an antenna function.

8. The space structure control system according to claim 1,
   wherein the artificial satellite has a function of controlling a rotation speed of the film-like structure using the propulsion device to retain the attitude of the film-like structure.

9. The space structure control system according to claim 1,
   wherein the artificial satellite has a function of separating the artificial satellite from the space structure to retain the shape of the film-like structure.

10. The space structure control system according to claim 1,
    wherein the solar reflectance control device controls an attitude of the three-dimensional shape of the film-like structure by controlling a solar reflectance in the reflecting mirror to control a solar radiation pressure to be applied to the reflecting mirror.

11. The space structure control system according to claim 1,
- wherein the film-like structure is formed of a plurality of thin film satellite modules obtained by radially dividing a thin film having the three-dimensional shape,
- an end satellite is connected to a thin film end portion of the thin film satellite module,
- the artificial satellite is connected to a central axis of the film-like structure, and
- the film-like structure is deployed to form the three-dimensional shape using the centrifugal force with which the film-like structure is rotated by the propulsion device and the end satellite installed on the artificial satellite.

12. The space structure control system according to claim 1,
- wherein the film-like structure is formed of a plurality of thin film satellite modules that are arranged and connected in a radiation direction and a circumferential direction of a thin film having the three-dimensional shape,
- an end satellite is connected to an apex of the thin film of the thin film satellite module, and
- the thin film is held or pulled to deploy the thin film satellite module using the end satellite connected to the thin film satellite module and the plurality of thin film satellite modules are connected to each other to form the three-dimensional shape.

13. The space structure control system according to claim 12,
- wherein an array patch antenna is provided at an end portion of the thin film satellite module.

14. A space structure control method for a space structure control system that controls a shape of a space structure to be deployed in space,
- the space structure control system including the space structure, an artificial satellite connected to the space structure, and a propulsion device installed on the artificial satellite and configured to control an orbit and an attitude of the artificial satellite, the space structure including a film-like structure, and
- the space structure control method comprising:
- rotating the film-like structure using the propulsion device to generate a centrifugal force;
- controlling a solar reflectance in a reflecting mirror provided in the film-like structure to control a solar radiation pressure to be applied to the reflecting mirror;
- controlling a three-dimensional shape of the film-like structure based on the centrifugal force generated by the rotation of the film-like structure and the solar radiation pressure; and
- retaining or stabilizing the shape of the film-like structure.

15. The space structure control method according to claim 14,
- wherein the artificial satellite is connected to a central axis of the film-like structure, and
- the film-like structure is deployed to form the three-dimensional shape using the centrifugal force with which the film-like structure is rotated by the propulsion device installed on the artificial satellite.

* * * * *